US012670757B2

(12) United States Patent
Saito et al.

(10) Patent No.: US 12,670,757 B2
(45) Date of Patent: Jun. 30, 2026

(54) PASSAGE MANAGEMENT COMPUTER PROGRAM PRODUCT, PASSAGE MANAGEMENT METHOD, AND PASSAGE MANAGEMENT DEVICE

(71) Applicant: KABUSHIKI KAISHA TOSHIBA, Tokyo (JP)

(72) Inventors: Hiroo Saito, Kawasaki (JP); Osamu Yamaguchi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 205 days.

(21) Appl. No.: 18/454,909

(22) Filed: Aug. 24, 2023

(65) Prior Publication Data

US 2024/0144762 A1 May 2, 2024

(30) Foreign Application Priority Data

Oct. 31, 2022 (JP) ................................. 2022-174155

(51) Int. Cl.
| | |
|---|---|
| *G07C 9/15* | (2020.01) |
| *G06V 40/16* | (2022.01) |
| *G07C 9/25* | (2020.01) |

(52) U.S. Cl.
CPC ............ *G07C 9/15* (2020.01); *G06V 40/161* (2022.01); *G06V 40/172* (2022.01); *G07C 9/25* (2020.01)

(58) Field of Classification Search
CPC ...... G06V 40/172; G06V 40/161; G07C 9/10; G07C 9/15; G07C 9/25
See application file for complete search history.

(56) References Cited

U.S. PATENT DOCUMENTS

| | | | | |
|---|---|---|---|---|
| 2006/0204050 A1* | 9/2006 | Takizawa | ............... | G06V 40/67 |
| | | | | 382/115 |
| 2015/0339523 A1* | 11/2015 | Tsunematsu | ......... | G06V 40/172 |
| | | | | 382/103 |

(Continued)

FOREIGN PATENT DOCUMENTS

| | | |
|---|---|---|
| JP | 2004-265232 A | 9/2004 |
| JP | 2006-268144 A | 10/2006 |

(Continued)

OTHER PUBLICATIONS

Japanese Office Action issued on Sep. 2, 2025 in Japanese Patent Application No. 2022-174155 (with unedited computer-generated English translation), 5 pages.

*Primary Examiner* — Yong Hang Jiang
(74) *Attorney, Agent, or Firm* — Oblon, McClelland, Maier & Neustadt, L.L.P.

(57) ABSTRACT

In a passage management computer program product, acquiring processing of identification information acquires identification information of a user read by a reading unit that is installed in a passage area and that reads the identification information from an authentication medium. Acquiring processing of photographed image acquires a photographed image of the passage area. Among one or more face image regions in the photographed image, specifying processing specifies a face image region of a user who is carrying the authentication medium as a passerby face image. When the passerby face image matches with a pre-stored face image corresponding to the identification information, authenticating processing authenticates the user who is carrying the authentication medium as an authorized person, and when the passerby face image does (Continued)

1 not match with the pre-stored face image, authenticates the user who is carrying the authentication medium as an unauthorized person.

10 Claims, 6 Drawing Sheets

(56)                    References Cited

U.S. PATENT DOCUMENTS

| 2016/0110588 | A1* | 4/2016 | Ikenoue | ................ | G06V 40/50 |
| | | | | | 382/118 |
| 2018/0122166 | A1* | 5/2018 | Singh | ................ | G07C 9/00904 |
| 2019/0268158 | A1* | 8/2019 | Lentini | .................... | H04L 9/30 |
| 2019/0340422 | A1* | 11/2019 | Alvin | ................... | G06V 40/172 |
| 2020/0410074 | A1* | 12/2020 | Dang | .............. | G06V 30/19173 |
| 2022/0406068 | A1* | 12/2022 | Kawase | .............. | G06Q 50/265 |

FOREIGN PATENT DOCUMENTS

| WO | WO 2015/136938 | A1 | 9/2015 |
| WO | WO 2020/152917 | A1 | 7/2020 |

* cited by examiner

<u>1</u>

USER MANAGEMENT
INFORMATION

12A

| IDENTIFICATION INFORMATION | CORRECT FACE IMAGE |
|---|---|

10

PASSAGE MANAGEMENT COMPUTER PROGRAM PRODUCT, PASSAGE MANAGEMENT METHOD, AND PASSAGE MANAGEMENT DEVICE

CROSS-REFERENCE TO RELATED APPLICATIONS

This application is based upon and claims the benefit of priority from Japanese Patent Application No. 2022-174155, filed on Oct. 31, 2022; the entire contents of which are incorporated herein by reference.

FIELD

Embodiments described herein relate generally to a passage management computer program product, a passage management method, and a passage management device.

BACKGROUND

Systems that authenticate users passing a passage area are known. For example, a system is disclosed that determines as an authentication failure, when the positional relation between the position of a face and the position of parts other than the face of a visitor in the photographed image is not normal. Moreover, a system is disclosed that determines the passage detected after detecting the passage of an authorized passerby, is an unauthorized passage. Furthermore, there is a known technique that determines as an authentication failure, when the identification information read from the authentication medium in which the identification information of the user is recorded does not match with the pre-stored identification information.

However, with the conventional techniques, it may be difficult to detect misapplication, when an authorized person user and an unauthorized user are both captured in a photographed image to be verified at the same time, or when an unauthorized user is carrying the authentication medium of the authorized user. In other words, with the conventional techniques, the security for the passage may be lowered.

DETAILED DESCRIPTION

According to an embodiment, a passage management computer program product has a non-transitory computer readable medium including programmed instructions. When executed by a computer, the instructions cause the computer to execute: acquiring identification information of a user read by a reading unit that is installed in a passage area and that reads the identification information from an authentication medium; acquiring a photographed image of the passage area; specifying, among one or more face image regions in the photographed image, a face image region of a user who is carrying the authentication medium as a passerby face image; and, when the passerby face image matches with a pre-stored (correct) face image corresponding to the identification information, authenticating the user who is carrying the authentication medium as an authorized person, and when the passerby face image does not match with the pre-stored face image, authenticating the user who is carrying the authentication medium as an unauthorized person. An object of the embodiments herein is to provide a passage management computer program product, a passage management method, and a passage management device that can improve the security measures for the passage.

Hereinafter, a passage management computer program product, a passage management method, and a passage management device of the present embodiment will be described in detail with reference to the accompanying drawings.

Figure 1:
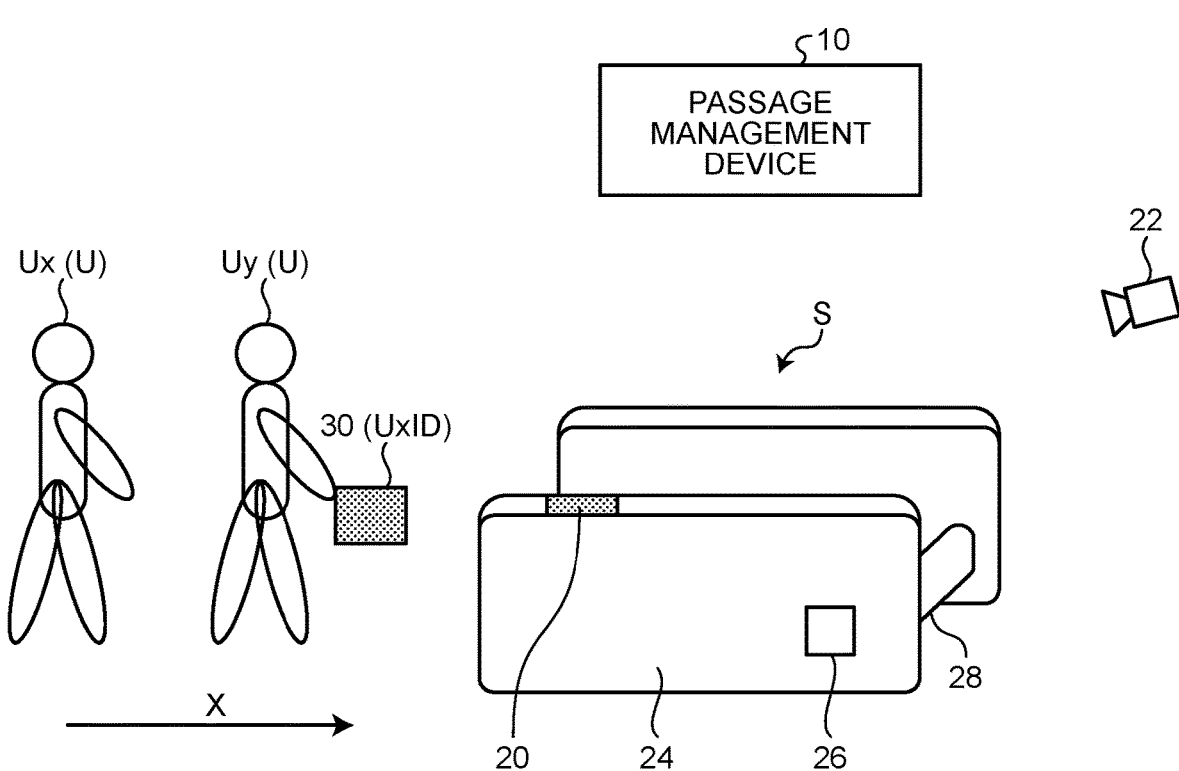
FIG. 1 is a schematic diagram of a passage management system.

FIG. 1 is a schematic diagram of an example of a passage management system 1 of the present embodiment.

The passage management system 1 includes a passage management device 10, a reading unit 20, and a photographing unit 22. The passage management device 10, the reading unit 20, and the photographing unit 22 are communicatively connected.

The passage management device 10 is an information processing device that manages the passage of a user U who attempts to pass through a passage area S.

The passage area S is an area where the passage of the user U is managed by the passage management device 10. For example, the passage area S is an area including an entrance used when the user U enters or leaves a predetermined area, a boundary between a certain area and the other area, and the like. The predetermined area is an area where the entry or exit of the user U is to be managed. For example, the predetermined area is an area within a specific building, an area where means of transportation such as a train can be used, a specific outdoor area, and the like. However, the predetermined area is not limited thereto.

For example, the passage area S includes an entrance enclosure 24. The entrance enclosure 24 is an enclosure installed in the passage area S. The entrance enclosure 24 includes the reading unit 20, an entrance opening/closing drive unit 26, and a door member 28.

The reading unit 20 is a reading device that reads identification information of the user U from an authentication medium 30. The reading unit 20 is installed in the passage area S. In the present embodiment, for example, the reading unit 20 is provided on the entrance enclosure 24 installed in the passage area S. The reading unit 20 may be any device that reads identification information from the authentication medium 30, when the authentication medium 30 is brought into contact with or in proximity of the reading unit 20 in a contact or non-contact manner, and that transmits the read identification information to the passage management device 10. In proximity means that the authentication medium 30 and the reading unit 20 are located within a communicable range.

The reading unit 20 is, for example, a barcode reader that reads a barcode and transmits identification information, a magnetic card reader that transmits identification information by reading magnetic information, a device that reads identification information included in a photographed image from the photographed image and transmits the read identification information, a device that reads identification information from a storage medium such as a memory card and transmits the read identification information, and the like. The barcode, for example, includes a one-dimensional barcode, a two-dimensional barcode, and the like.

The authentication medium 30 is a medium that can be carried by the user U. Moreover, the authentication medium 30 is a medium that can provide the reading unit 20 with the identification information of the user U in a readable manner. The identification information of the user U may be any information as long as the user can be uniquely identified. For example, the identification information of the user U includes a management number of the user U such as an employee number, a number such as a passport number issued in advance to the user U, and the like. However, the identification information is not limited thereto.

For example, the authentication medium 30 is a portable terminal that can display a barcode representing the identification information of the user U on the display screen. In this case, for example, the authentication medium 30 is a smartphone, a tablet terminal, and the like provided with a display unit. Moreover, for example, the authentication medium 30 is a medium such as paper and resin on which characters, a barcode, and the like representing the identification information of the user U, are recorded by printing and the like. In this case, for example, the authentication medium 30 is a traffic ticket such as a passport, an employee card, and the like. Furthermore, for example, the authentication medium 30 includes a storage medium in which the identification information of the user U is stored, and is a medium from which the reading unit 20 can read the identification information stored in the storage medium, when the authentication medium 30 is brought into contact with or in proximity of the reading unit 20. In this case, for example, the authentication medium 30 is a device having a communication function and a storage medium.

In the present embodiment, it is assumed that the authentication medium 30 is a paper medium on which characters or a barcode representing the identification information is recorded, or a portable terminal that can display characters or a barcode representing the identification information. Moreover, in the present embodiment, it is assumed that the reading unit 20 reads identification information from the authentication medium 30, when the characters or a barcode representing the identification information in the authentication medium 30 is brought into contact with or in proximity of the reading unit 20, and transmits the read identification information to the passage management device 10.

The photographing unit 22 is a device that takes a photograph of the passage area S, and transmits the photographed image data to the passage management device 10. Hereinafter, the photographed image data is simply referred to as a photographed image. The photographing unit 22 includes the reading unit 20 included in the passage area S, and the photographic angle of view and the photographing direction are adjusted in advance such that an area including the face of the user U and body parts other than the face can be photographed, when the user U is present in the vicinity of the reading unit 20. In the present embodiment, for example, the photographing unit 22 sequentially takes photographs of the passage area S in time series, and sequentially transmits the photographed images that are taken, to the passage management device 10. Moreover, the photographing unit 22 imprints the shooting time on the photographed images, and transmits the photographed images on which the shooting time is imprinted, to the passage management device 10.

The entrance opening/closing drive unit 26 is a drive mechanism for driving the door member 28. The entrance opening/closing drive unit 26 is communicatively connected to the passage management device 10. The entrance opening/closing drive unit 26 drives the door member 28 according to the control performed by the passage management device 10. By driving the door member 28, the entrance opening/closing drive unit 26 switches the state of the door member 28 so as to allow or restrict the user U to pass through the passage area S. For example, the door member 28 is provided in an openable and closable manner. When the entrance opening/closing drive unit 26 switches the door member 28 to an open state, the user U can pass through the passage area S in the arrow direction X, for example. When the entrance opening/closing drive unit 26 switches the door member 28 to a closed state, the user U is restricted from passing the passage area S.

As described above, the authentication medium 30 is a medium that can be carried by the user U, and is a medium that can provide the reading unit 20 with the identification information of the user U in a readable manner. The user U who passes through the passage area S enters the passage area S while carrying the authentication medium 30, and attempts to pass through the passage area S in the arrow direction X, for example, by bringing the authentication medium 30 into contact with or in proximity of the reading unit 20. The passage of the user U who attempts to pass through the passage area S is managed by the passage management device 10 (this will be described in detail below).

Figure 2:
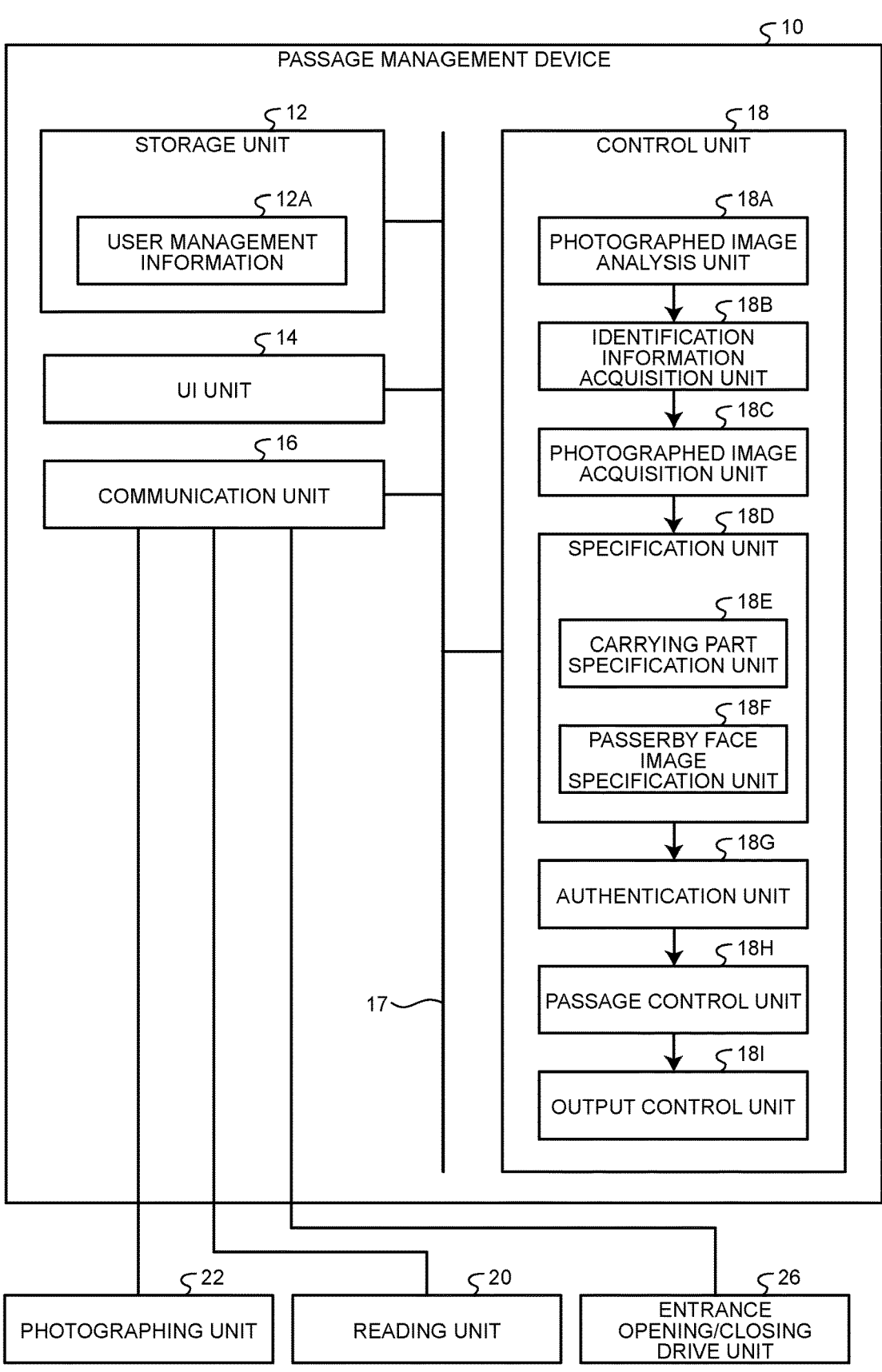
FIG. 2 is a functional block diagram of a passage management device.

FIG. 2 is a functional block diagram of an example of the passage management device 10 of the present embodiment. FIG. 2 also illustrates the photographing unit 22, the reading unit 20, and the entrance opening/closing drive unit 26 for description.

The passage management device 10 includes a storage unit 12, a user interface (UI) unit 14, a communication unit 16, and a control unit 18. The storage unit 12, the UI unit 14, the communication unit 16, and the control unit 18 are communicatively connected to one another via a bus 17 or the like The storage unit 12 stores various types of data. In the present embodiment, the storage unit 12 pre-stores user management information 12A.

Figure 3:
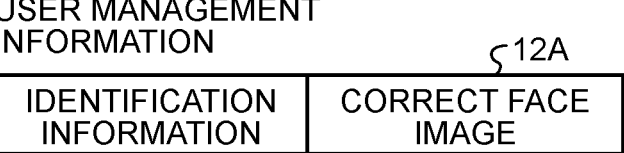
FIG. 3 is a schematic diagram of a data structure of user management information.

FIG. 3 is a schematic diagram of an example of a data structure of the user management information 12A.

The user management information 12A is a database for managing information on the authorized user U. The data format of the user management information 12A is not limited to a database. The user management information 12A is a database in which the identification information of the user U is associated with a correct (pre-stored) face image. The correct (pre-stored) face image is a face image of the user U identified by the corresponding identification information. For example, the face image is data obtained by extracting a face image region from the photographed image of the user U and the like. For example, in the user management information 12A, the identification information and the correct face image of the user U identified by the identification information are registered in an associated manner, by a registration process performed in advance by the control unit 18 and the like.

Returning to FIG. 2, the description will be continued.

The UI unit 14 has a display function that displays various types of information and, an input function that receives an operation input from the user. For example, the display function includes a display, a projection device, and the like.

For example, the input function is a pointing device such as a mouse or a touchpad, a keyboard, and the like. The UI unit 14 may also be a touch panel in which the display function and the input function are integrated.

The communication unit 16 is a communication interface for communicating with an external information processing device of the passage management device 10 and the like. In the present embodiment, the communication unit 16 communicates with the photographing unit 22, the reading unit 20, and the entrance opening/closing drive unit 26 provided on the entrance enclosure 24 of the passage area S, via a network or the like in a wireless or wired manner.

In the present embodiment, for each unit of the passage area S through which the users U can pass through one by one, the passage management device 10 manages the reading unit 20, the photographing unit 22, and the entrance opening/closing drive unit 26 provided in the passage area S of each unit. Therefore, when a plurality of the passage areas S are provided, the passage management device 10 manages the reading unit 20, the photographing unit 22, and the entrance opening/closing drive unit 26 provided in the passage area S, for each of the passage areas S. In the present embodiment, for example, a single reading unit 20, a single photographing unit 22, and a single entrance opening/closing drive unit 26 are provided in a single passage area S, and the passage management device 10 manages the reading unit 20, the photographing unit 22, and the entrance opening/closing drive unit 26.

At least one of the storage unit 12 and the UI unit 14 may be provided outside the passage management device 10. In this case, at least one of the storage unit 12 and the UI unit 14 may be able to communicate with the passage management device 10 via the network and the communication unit 16.

Moreover, at least one of the one or more function units, which will be described below, included in the storage unit 12, the UI unit 14, and the control unit 18 may be installed in an external information processing device communicatively connected to the passage management device 10 via the network or the like.

The control unit 18 performs information processing in the passage management device 10. The control unit 18 includes a photographed image analysis unit 18A, an identification information acquisition unit 18B, a photographed image acquisition unit 18C, a specification unit 18D, an authentication unit 18G, a passage control unit 18H, and an output control unit 18I. The specification unit 18D includes a carrying part specification unit 18E and a passerby face image specification unit 18F.

For example, the photographed image analysis unit 18A, the identification information acquisition unit 18B, the photographed image acquisition unit 18C, the specification unit 18D, the carrying part specification unit 18E, the passerby face image specification unit 18F, the authentication unit 18G, the passage control unit 18H, and the output control unit 18I are implemented by one or more processors. For example, each of the units described above may be implemented by causing a processor such as a central processing unit (CPU) to execute a computer program, that is, software. Each of the units described above may also be implemented by a processor such as a dedicated IC or a circuit, that is, hardware. Each of the units described above may also be implemented using software and hardware in combination. When a plurality of processors are used, each of the processors may implement one of the units or implement two or more of the units.

The photographed image analysis unit 18A sequentially receives photographed images from the photographing unit 22. As described above, the photographing unit 22 takes photographs of the passage area S, and sequentially transmits the photographed images on which the shooting time is imprinted, to the passage management device 10. The photographed image analysis unit 18A sequentially receives the photographed images on which the shooting time is imprinted, from the photographing unit 22 via the communication unit 16. The shooting time is the time when a photographed image 40 on which the shooting time is imprinted is taken.

Every time a new photographed image is received, the photographed image analysis unit 18A analyzes the photographed image, and generates the analysis results.

Figure 4:
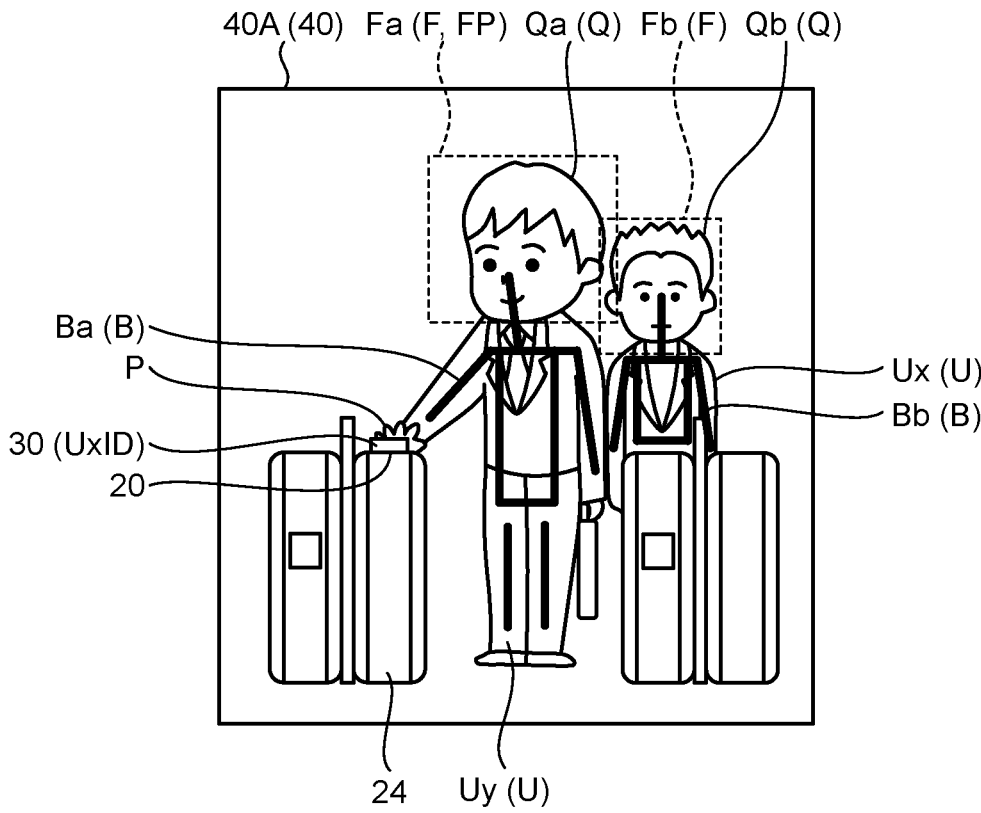
FIG. 4 is a schematic diagram of a photographed image.

FIG. 4 is a schematic diagram of an example of a photographed image 40A. The photographed image 40A is an example of the photographed image 40 of the passage area S taken by the photographing unit 22. As illustrated in FIG. 1, FIG. 4 illustrates an example of the photographed image 40 taken when two users U, a user Ux and a user Uy, are present within a photographing range of the photographing unit 22 of the passage area S. The user Ux and the user Uy are examples of the user U. Returning to FIG. 4, the description will be continued.

The photographed image analysis unit 18A analyzes a face image region F of the user U captured in the photographed image 40A, and skeleton information B of the user U, as analysis results.

The face image region F is a face area representing the face of the user U in the photographed image 40. The photographed image analysis unit 18A may analyze the face image region F of the user U in the photographed image 40, using a known image processing technique that specifies the face image region F from the photographed image 40.

In the case of the photographed image 40A illustrated in FIG. 4, the photographed image analysis unit 18A specifies a face image region Fa of the user Uy and a face image region Fb of the user Ux from the photographed image 40A. The face image region Fa and the face image region Fb are examples of the face image region F.

The skeleton information B is information representing the skeletal structure of the user U in the photographed image 40. The skeleton information B is information representing the position of each of multiple skeletons that make up the user U in the photographed image 40, the shape of the skeleton, and the like. The skeleton information B makes it possible to specify the position of each of the body parts of the user U captured in the photographed image 40, in the photographed image 40. Specifically, the skeleton information B describes adjacency of each joint of a human body such as a hand, an elbow, a shoulder, etc. of the user U in the photographed image 40.

The photographed image analysis unit 18A may analyze the skeleton information B, using a known image processing technique that analyzes the skeleton information B from the photographed image 40.

In the case of the photographed image 40A illustrated in FIG. 4, the photographed image analysis unit 18A specifies skeleton information Ba of the user Uy and skeleton information Bb of the user Ux from the photographed image 40A. The skeleton information Ba and the skeleton information Bb are examples of the skeleton information B.

Returning to FIG. 2, the description will be continued.

Every time a new photographed image 40 is received from the photographing unit 22, the photographed image analysis unit 18A analyzes the photographed image 40, and sequentially stores the photographed image 40, the analysis results, and the shooting time in the storage unit 12 in an associated manner. The photographed image analysis unit 18A may store the photographed image 40 in the storage unit 12, until a predetermined number of images or amount of data is reached. Then, to store the new photographed image 40 that exceeds the number of images or amount of data in the storage unit 12, the photographed image analysis unit 18A may sequentially delete the photographed images 40 with the old shooting time from the storage unit 12, and store the newly received photographed image 40, the analysis results, and the shooting time in the storage unit 12 in an associated manner. Moreover, the photographed image analysis unit 18A may also control the storage of the photographed image 40 to be stored in the storage unit 12 so that the photographed image 40 of a predetermined period is stored in the storage unit 12 from the present to the past.

The identification information acquisition unit 18B acquires the identification information read from the authentication medium 30 by the reading unit 20 installed in the passage area S. For example, the reading unit 20 reads the identification information from the authentication medium 30, when the user U who is carrying the authentication medium 30 brings the authentication medium 30 into contact with or in proximity of the reading unit 20. Every time the identification information is read from the authentication media 30, the reading unit 20 transmits the read identification information and the reading time to the passage management device 10 in an associated manner. The identification information acquisition unit 18B acquires the identification information and the reading time corresponding to the identification information, from the reading unit 20 via the communication unit 16.

The photographed image acquisition unit 18C acquires the photographed image 40 of the passage area S. The photographed image acquisition unit 18C acquires the photographed image 40 of the passage area S, by reading the photographed image 40 analyzed by the photographed image analysis unit 18A, from the storage unit 12.

In detail, the photographed image acquisition unit 18C at least acquires the photographed image 40 taken when the reading unit 20 reads the identification information.

By reading the photographed image 40 associated with the shooting time that is the same as the reading time corresponding to the identification information acquired by the identification information acquisition unit 18B from the storage unit 12, the photographed image acquisition unit 18C at least acquires the photographed image 40 taken when the reading unit 20 reads the identification information.

Moreover, by reading the photographed image 40 associated with the shooting time within a predetermined time period, from the reading time corresponding to the identification information acquired by the identification information acquisition unit 18B, from the storage unit 12, the photographed image acquisition unit 18C may at least acquire the photographed image 40 taken when the reading unit 20 reads the identification information. The predetermined time period may be any period as long as it is possible to determine that the reading time of the identification information matches with the shooting time of the photographed image 40. In the present embodiment, the photographed image acquisition unit 18C acquires the photographed image 40 and the analysis results, by reading the photographed image 40 that satisfies the conditions described above and the analysis results corresponding to the photographed image 40, from the storage unit 12.

Among one or more face image regions F in the photographed image 40, the specification unit 18D specifies the face image region F of the user U who is carrying the authentication medium 30 as a passerby face image.

The specification unit 18D performs a specification process of the passerby face image, using the photographed image 40 acquired by the photographed image acquisition unit 18C. As described above, the photographed image acquisition unit 18C at least acquires the photographed image 40 taken when the reading unit 20 reads the identification information. Then, the specification unit 18D performs specification processing of the passerby face image, using the photographed image 40 acquired by the photographed image acquisition unit 18C. Therefore, among one or more face image regions F in the photographed image 40, the specification unit 18D specifies the face image region F of the user U who is carrying the authentication medium 30 when the reading unit 20 reads the identification information from the authentication medium 30, as the passerby face image.

The passerby face image is a face image of the user U passing the passage area S. In other words, the specification unit 18D specifies the face image region F of the user U who is carrying the authentication medium 30 when the reading unit 20 reads the identification information from the authentication medium 30, as the passerby face image of the user U passing the passage area S.

A description will be given with reference to FIG. 1. For example, as illustrated in FIG. 1, it is assumed that the two users U, the user Ux and the user Uy, are present within the photographing range of the passage area S by the photographing unit 22. Moreover, it is assumed that the user Uy is attempting to pass through the passage area S, while carrying the authentication medium 30.

In this case, in the photographed image 40 taken when the reading unit 20 reads the identification information from the authentication medium 30, a carrying part such as a hand of the user Uy who is carrying the authentication medium 30 is captured.

Returning to FIG. 2, the description will be continued. Therefore, the specification unit 18D specifies the passerby face image in the photographed image 40, using at least the photographed image 40 taken when the reading unit 20 reads the identification information that is acquired by the photographed image acquisition unit 18C.

The process of the specification unit 18D will be described in detail.

The specification unit 18D includes a carrying part specification unit 18E and a passerby face image specification unit 18F.

The carrying part specification unit 18E specifies the carrying part of the authentication medium 30 on the body of the user U captured in the photographed image 40, from the photographed image 40. Among one or more face image regions F in the photographed image 40, the passerby face image specification unit 18F specifies the face image region F of the user U with the carrying part specified by the carrying part specification unit 18E as a part of the body, as the passerby face image.

A description will be given with reference to FIG. 4. For example, the carrying part specification unit 18E specifies an area of the authentication medium 30 in the photographed image 40A. A known image processing technique such as pattern matching may be used to specify the area of the authentication medium 30 in the photographed image 40A. Then, the specification unit 18D specifies the body part of the user U overlapping or adjacent to the area of the specified authentication medium 30 in the photographed image 40A, as a carrying part P of the authentication medium 30 of the user U. Among multiple parts such as hands and feet that make up the body of the user U, the carrying part P is a part carrying the authentication medium 30.

In detail, the carrying part specification unit 18E specifies the carrying part P captured in the photographed image 40A acquired by the photographed image acquisition unit 18C, using the analysis results corresponding to the photographed image 40A. As described above, the skeleton information B is included in the analysis results of the photographed image 40A obtained by the photographed image analysis unit 18A. Moreover, as described above, the position of each of the body parts of the user U captured in the photographed image 40A can be specified by the skeleton information B.

Therefore, among the body parts of the user U specified by the skeleton information B in the photographed image 40, the specification unit 18D specifies the part in the photographed image 40 overlapping or adjacent to the area of the specified authentication medium 30, as the carrying part P. It is assumed that the reading unit 20 reads the identification information from the authentication medium 30, when the authentication medium 30 is brought into contact with or in proximity of the reading unit 20, while the user U is holding the authentication medium 30 in his/her hand. In this case, the specification unit 18D specifies the hand of the user U as the carrying part P.

The part of the user U that carries the authentication medium 30 is not limited to the hand. For example, the user U may cause the reading unit 20 to read the identification information from the authentication medium 30, while carrying the authentication medium 30 in his/her arm, in a pocket of the clothes, and the like. In this case, the specification unit 18D specifies the body part such as the arm of the user, the chest where a pocket is located, or the like, as the carrying part P. In the case of the photographed image 40A illustrated in FIG. 4, the specification unit 18D specifies the hand of the user Uy as the carrying part P.

Among one or more face image regions F (face image region Fa, face image region Fb) in the photographed image 40A, the passerby face image specification unit 18F specifies the face image region F of the user U with the carrying part P specified by the carrying part specification unit 18E as a part of the body, as a passerby face image FP.

By using the positional relation between the carrying part P on the basis of the skeleton information B of the user U in the photographed image 40 and a face position Q of each of one or more face image regions F on the basis of the skeleton information B in the photographed image 40, the passerby face image specification unit 18F specifies the face image region F of the user U with the carrying part P as a part of the body, as the passerby face image FP.

In the case of the photographed image 40A illustrated in FIG. 4, the passerby face image specification unit 18F specifies the face image region Fa and the face image region Fb as the multiple face image regions F included in the analysis results corresponding to the photographed image 40A. Moreover, the passerby face image specification unit 18F specifies a face position Qa in the face image region Fa and a face position Qb in the face image region Fb in the photographed image 40A. The face position Qa and the face position Qb are examples of the face position Q in the face image region F in the photographed image 40.

Moreover, the passerby face image specification unit 18F specifies skeleton information Ba and skeleton information Bb as the skeleton information B included in the analysis results corresponding to the photographed image 40A.

Next, by using the location of the carrying part P specified by the carrying part specification unit 18E in the photographed image 40A, the skeleton information Ba and skeleton information Bb, and the face position Qa in the face image region Fa and the face position Qb in the face image region Fb, the passerby face image specification unit 18F specifies the face image region Fa of the user U who is the same person as the user U with the carrying part P, as the passerby face image FP.

In detail, by using the skeleton information B, the passerby face image specification unit 18F specifies the face image region F of the face position Q at the location of the head of the user U, that is determined to have an appropriate human body positional relation with respect to the carrying part P being a part of the body of the user U, and who is determined to be the same person as the user U with the carrying part P, as the passerby face image FP. Determination criteria for determining the location of the head of the user U who is the same person as the user U with the carrying part P, may be pre-stored in the storage unit 12 according to the type of the carrying part P. Then, by using the type of the carrying part P and the corresponding determination criteria, the passerby face image specification unit 18F specifies the face image region F of the user U who is the same person as the user U with the carrying part P.

In the case of the photographed image 40A illustrated in FIG. 4, as the face image region F of the user U who is the same person as the user Uy with the carrying part P, the passerby face image specification unit 18F specifies the face image region Fa located at the face position Qa that is appropriate as a human body positional relation with respect to the carrying part P, and corresponding to the location of the head of the user U who is the same person as the user U with the carrying part P. Then, the passerby face image specification unit 18F specifies the specified face image region Fa as the passerby face image FP.

Through these processes, between the face image region Fa and the face image region Fb in the photographed image 40A, the specification unit 18D specifies the face image region Fa of the user Uy who is carrying the authentication medium 30 when the reading unit 20 reads the identification information, as the passerby face image FP. In other words, in the case of the photographed image 40A, the passerby face image specification unit 18F specifies the face image region Fa of the user Uy having the hand serving as the carrying part P that is carrying the authentication medium 30 as a part of the body, as the passerby face image FP.

Returning to FIG. 2, the description will be continued.

The photographed image acquisition unit 18C may acquire the photographed image 40 from which the carrying part P of the user U when the reading unit 20 reads the identification information can be estimated by the specification unit 18D, from the storage unit 12. Therefore, the photographed image 40 acquired by the photographed image acquisition unit 18C is not limited to a single photographed image 40 taken when the reading unit 20 reads the identification information.

For example, the photographed image acquisition unit 18C may acquire a plurality of the photographed images 40 of the passage area S taken in time series, from the storage unit 12. In detail, the photographed image acquisition unit 18C may acquire one of the photographed images 40 that continue in time series from the shooting time that is the same as the reading time corresponding to the identification information acquired by the identification information acquisition unit 18B toward the past time, the photographed images 40 that continue in time series from the shooting time that is the same as the reading time toward the future time, and the photographed images 40 that continue in time series from the reading time toward both past time and future time, from the storage unit 12. In this process, the photographed image acquisition unit 18C also reads the analysis results corresponding to each of the photographed images 40, from the storage unit 12.

In this case, on the basis of the photographed images 40 acquired by the photographed image acquisition unit 18C, the carrying part specification unit 18E of the specification unit 18D may specify the carrying part P by estimating the carrying part P of the authentication medium 30 when the reading unit 20 reads the identification information.

For example, the carrying part specification unit 18E tracks the movement of the carrying part P along the time series, by specifying the carrying part P in each of the photographed images 40 that continue in time series. A known image processing technique or the like may be used for this tracking process. Then, by using the tracking results of the movement of the carrying part P, the carrying part specification unit 18E may specify the location of the carrying part P, by estimating the location of the carrying part P at the reading time of the identification information.

In this case, even if it is difficult to specify the location of the carrying part P from the photographed image 40 at the reading time of the identification information by the reading unit 20, the carrying part specification unit 18E can estimate the location of the carrying part P at the reading time of the identification information by the tracking process described above.

Next, the authentication unit 18G is described.

The authentication unit 18G determines whether the passerby face image FP specified by the specification unit 18D matches with the correct face image corresponding to the identification information acquired by the identification information acquisition unit 18B.

The authentication unit 18G reads the correct face image corresponding to the identification information acquired by the identification information acquisition unit 18B from the user management information 12A. Then, the authentication unit 18G determines whether the read correct face image matches with the passerby face image FP specified by the specification unit 18D. If the feature value of the correct face image and the feature value of the passerby face image FP are the same or similar, the authentication unit 18G determines that the correct face image matches with the passerby face image FP. A known image processing technique may be used to extract feature values from images. To determine the similarity, a threshold for the difference in feature values that can be used to determine whether the passerby face image FP and the correct face image are images of the face of the same person, may be determined in advance. Then, when the difference in the feature values is less than the threshold, the authentication unit 18G can determine that the correct face image matches with the passerby face image FP.

If it is determined that the correct face image matches with the passerby face image FP, the authentication unit 18G authenticates the user U who is carrying the authentication medium 30 as an authorized person. The user U who is carrying the authentication medium 30 is the user U who is carrying the authentication medium 30 from which the identification information acquired by the identification information acquisition unit 18B is read. In other words, the user U who is carrying the authentication medium 30 is the user U who is carrying the authentication medium 30 when the reading unit 20 reads the identification information.

On the other hand, if it is determined that the correct face image does not match with the passerby face image FP, the authentication unit 18G recognizes (authenticates) that the user U who is carrying the authentication medium 30 as an unauthorized person. In other words, if the correct face image does not match with the passerby face image FP, the authentication unit 18G recognizes the user U who is carrying the authentication medium 30 when the reading unit 20 reads the identification information, as an unauthorized person.

The identification information acquired by the identification information acquisition unit 18B may not be registered in the user management information 12A. Therefore, if the identification information acquired by the identification information acquisition unit 18B is not registered in the user management information 12A, the authentication unit 18G may recognize the user U identified by the identification information, as an unauthorized person.

In addition, the passerby face image specification unit 18F may not be able to specify the passerby face image FP. For example, the passerby face image specification unit 18F cannot specify the passerby face image FP, when the user U enters the passage area S by hiding his/her face. In this case, the face image region F of the user U with the carrying part P of the authentication medium 30 as a part of the body will not be captured in the photographed image 40. Therefore, the passerby face image specification unit 18F may not be able to specify the passerby face image FP. In this case, the authentication unit 18G may recognize the user U identified by the identification information acquired by the identification information acquisition unit 18B, as an unauthorized person.

According to the authentication results from the authentication unit 18G, the passage control unit 18H controls the entrance opening/closing drive unit 26 provided in the passage area S, to allow or restrict the user U to pass through the passage area S.

A description will be given with reference to FIG. 1. If the authentication results from the authentication unit 18G indicate that the user U is an authorized person, the passage control unit 18H controls the entrance opening/closing drive unit 26 to switch the door member 28 to an open state. By controlling the entrance opening/closing drive unit 26 by the passage control unit 18H, the entrance opening/closing drive unit 26 switches the state of the door member 28 to an open state. When the entrance opening/closing drive unit 26 switches the door member 28 to an open state, the user U attempting to pass through the passage area S can pass through the passage area S.

If the authentication results from the authentication unit 18G indicate that the user U is the unauthorized person, the passage control unit 18H controls the entrance opening/closing drive unit 26 to switch the door member 28 to a closed state. By controlling the entrance opening/closing drive unit 26 by the passage control unit 18H, the entrance opening/closing drive unit 26 switches the state of the door member 28 to a closed state. When the entrance opening/closing drive unit 26 switches the door member 28 to a closed state, the user U attempting to pass through the passage area S is restricted from passing the passage area S.

Returning to FIG. 2, the description will be continued.

The output control unit 18I outputs the authentication results from the authentication unit 18G. For example, the output control unit 18I displays the authentication results from the authentication unit 18G on the UI unit 14. The output control unit 18I may transmit the authentication results from the authentication unit 18G to an external information processing device via the communication unit 16. Moreover, the output control unit 18I may also output the authentication results from the authentication unit 18G to the output mechanism provided in the entrance enclosure 24. For example, the output mechanism includes a display that displays images, a speaker that outputs sound, light that emits light, and the like. However, it is not limited thereto.

Next, an example of the flow of information processing performed by the passage management device 10 in the present embodiment will be described.

Figure 5:
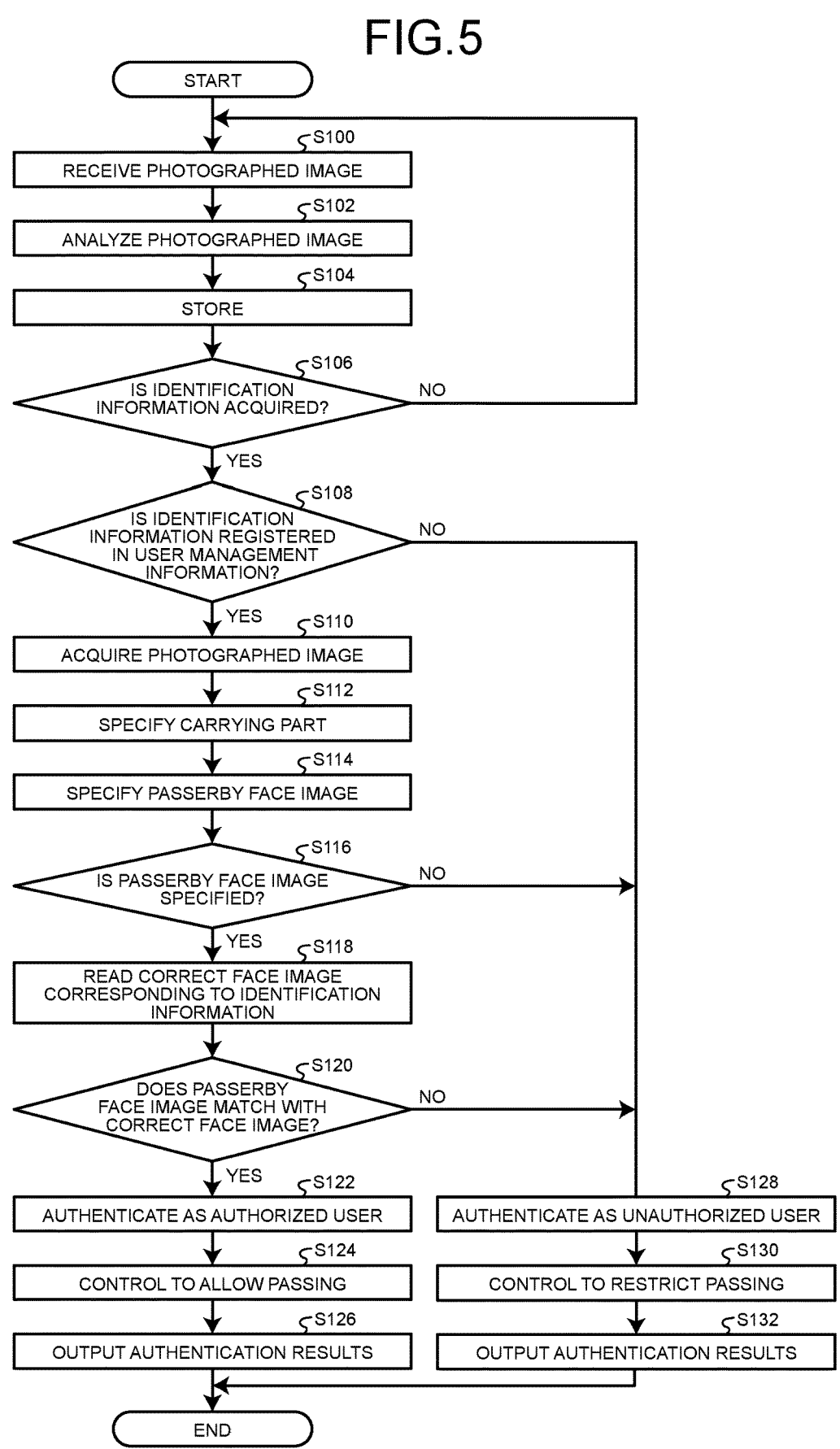
FIG. 5 is a flowchart of the flow of information processing.

FIG. 5 is a flowchart illustrating an example of the flow of information processing performed by the passage management device 10 of the present embodiment.

The photographed image analysis unit 18A receives the photographed image 40 from the photographing unit 22 (step S100). The photographed image analysis unit 18A analyzes the photographed image 40 received at step S100 (step S102). The photographed image analysis unit 18A stores the analysis results analyzed at step S102, the photographed image 40 used for analysis, and the shooting time of the photographed image 40 in the storage unit 12 in an associated manner (step S104). The analysis results of the photographed image 40 includes the face image region F and the skeleton information B.

Compared to when the specification unit 18D performs the specification process after analyzing the photographed image 40 and deriving the analysis results, when the photographed image analysis unit 18A analyzes the photographed image 40, it is possible to reduce the processing time from when the identification information is read from the authentication medium 30 to when the authentication results are output.

The identification information acquisition unit 18B determines whether the identification information is acquired from the reading unit 20 (step S106). When the identification information acquisition unit 18B determines that the identification information is not acquired at step S106 (No at step S106), the process returns to step S100. When the identification information acquisition unit 18B determines that the identification information is acquired at step S106 (Yes at step S106), the process proceeds to step S108.

At step S108, the authentication unit 18G determines whether the identification information acquired at step S106 is registered in the user management information 12A (step S108). When the authentication unit 18G determines that the identification information is not yet registered (No at step S108), the process proceeds to step S128, which will be described below. When the authentication unit 18G determines that the identification information is registered (Yes at step S108), the process proceeds to step S110.

At step S110, the photographed image acquisition unit 18C acquires the photographed image 40 of the passage area S (step S110). For example, in the photographed image 40 analyzed by the photographed image analysis unit 18A, the photographed image acquisition unit 18C acquires the photographed image 40 at the shooting time that matches with the reading time of the identification information acquired at step S106.

The carrying part specification unit 18E specifies the carrying part P of the authentication medium 30 on the body of the user U captured in the photographed image 40, from the photographed image 40 acquired at step S110 (step S112).

Among one or more face image regions F in the photographed image 40 acquired at step S110, the passerby face image specification unit 18F specifies the face image region F of the user U with the carrying part P specified at step S112 as a part of the body, as the passerby face image FP (step S114).

The authentication unit 18G determines whether the authentication unit 18G specifies the passerby face image FP at step S114 (step S116). When the authentication unit 18G determines that the passerby face image FP is not specified, (No at step S116), the process proceeds to step S128. When the authentication unit 18G determines that the passerby face image FP is specified (Yes at step S116), the process proceeds to step S118.

At step S118, by reading the correct face image corresponding to the identification information acquired at step S106, the authentication unit 18G determines whether the passerby face image FP specified at step S114 matches with the correct face image corresponding to the identification information (step S120). When the authentication unit 18G determines that the passerby face image FP matches with the correct face image (Yes at step S120), the process proceeds to step S122.

At step S122, the user U who is carrying the authentication medium 30 in which the identification information acquired at step S106 is recorded, is authenticated as the authorized person (step S122).

Next, the passage control unit 18H controls the entrance opening/closing drive unit 26 provided in the passage area S, to allow passing of the passage area S by the user U (step S124). The output control unit 18I outputs the authentication results indicating that the user U is the authorized person (step S126). Then, the present routine is terminated.

On the other hand, when the authentication unit 18G determines that the passerby face image FP does not match with the correct face image at step S120 (No at step S120), the process proceeds to step S128.

At step S128, the authentication unit 18G recognizes that the user U in the passage area S is an unauthorized person (step S128). By the process at step S128, the authentication unit 18G recognizes the user U, who carries the authentication medium 30 in which the identification information acquired at step S106 is recorded, when the reading unit 20 reads the identification information, as the unauthorized person.

Next, the passage control unit 18H controls the entrance opening/closing drive unit 26 provided in the passage area S, to restrict the user U from passing the passage area S (step S130). The output control unit 18I outputs the authentication results indicating that the user U is an unauthorized person (step S132). Then, the present routine is terminated.

As described above, the passage management device 10 of the present embodiment includes the identification information acquisition unit 18B, the photographed image acquisition unit 18C, the specification unit 18D, and the authentication unit 18G. The photographed image analysis unit 18A acquires the identification information read by the reading unit 20 that is installed in the passage area S and that reads the identification information of the user U from the authentication medium 30. The photographed image acquisition unit 18C acquires the photographed image 40 of the passage area S. Among one or more face image regions F in the photographed image 40, the specification unit 18D specifies the face image region F of the user U who is carrying the authentication medium 30, as the passerby face image FP. When the passerby face image FP matches with the correct face image that is pre-stored and that corresponds to the identification information, the authentication unit 18G authenticates the user U who is carrying the authentication medium 30 as the authorized person. When the passerby face image FP does not match with the correct face image, the authentication unit 18G recognizes the user U who is carrying the authentication medium 30 as the unauthorized person.

In this example, as a conventional technique, a technique is disclosed that prevents unauthorized entry using a facial picture of an authorized user, by determining that authentication is not possible, when the positional relation between the position of a face and the position of parts other than the face of a visitor in the photographed image is not normal. However, with the conventional technique, when a user not hiding his/her face is captured in the single photographed image 40 along with a user who is hiding his/her face, it is not possible to determine that the authentication is not possible. Moreover, with the conventional technique, when a user is passing using the authentication medium 30 in which the identification information of another user is recorded, while the face of the user is captured in the photographed image 40, it is not possible to determine that authentication is not possible.

Furthermore, as a conventional technique, a conventional technique is disclosed that prevents a non-authorized passerby from passing along with an authorized passerby, by determining the passage detected after detecting the passage of the authorized passerby, as an unauthorized passage. However, with the conventional technique, it has been difficult to determine misapplication, when the authorized passerby and the unauthorized passerby attempt to pass through the passage area S at the same time and the like.

In this manner, with the conventional technique, it may be difficult to detect misapplication, in situations such as when the authorized user U and the unauthorized user U are both captured in the photographed image 40 to be verified at the same time, and when the unauthorized user U is carrying the authentication medium 30 of the authorized user U. In other words, with the conventional techniques, the security measures for passage may be deteriorated.

On the other hand, in the passage management device 10 of the present embodiment, among one or more face image regions F in the photographed image 40, the specification unit 18D specifies the face image region F of the user U who is carrying the authentication medium 30 as the passerby face image FP. Then, if the passerby face image FP does not match with the correct face image that is pre-stored and that corresponds to the identification information read from the authentication medium 30, the authentication unit 18G recognizes the user U who is carrying the authentication medium 30 as an unauthorized person.

In this manner, the passage management device 10 of the present embodiment specifies the face image region F of the user U who is carrying the authentication medium 30 in which the identification information is stored as the passerby face image FP, and by comparing the passerby face image FP with the correct face image corresponding to the identification information, recognizes the user U as an authorized person or an unauthorized person.

Therefore, in a case where the authorized user U and the unauthorized user U are both captured in the photographed image 40 to be verified at the same time, or where the unauthorized user U is carrying the authentication medium 30 of the authorized user U, the passage management device 10 of the present embodiment can accurately authenticate or recognize the user U as an authorized person or an unauthorized person.

Thus, the passage management device 10 of the present embodiment can improve the security measures for the passage.

Effects of the passage management device 10 of the present embodiment will be described in detail with reference to FIG. 1, FIG. 4, FIG. 6, and FIG. 7, using specific examples.

For example, as illustrated in FIG. 1, it is assumed that the two users U, the user Ux and the user Uy, are present within the photographing range of the passage area S by the photographing unit 22. Moreover, it is assumed that although the identification information and correct face image of the user Ux are registered in the user management information 12A in an associated manner, at least one of the identification information and correct face image of the user Uy is not registered in the user management information 12A. Furthermore, it is assumed that the user Uy is attempting to pass through the passage area S, while carrying the authentication medium 30 in which the identification information on the user Ux is recorded instead of his/her own identification information (in FIG. 1, see "UxID"). Still furthermore, it is assumed that the user Uy and the user Ux are adjusting the position of each other in cooperation so that the user Uy and the user Ux are present within the photographing range of the photographing unit 22, when the reading unit 20 reads the authentication medium 30.

Figure 6:
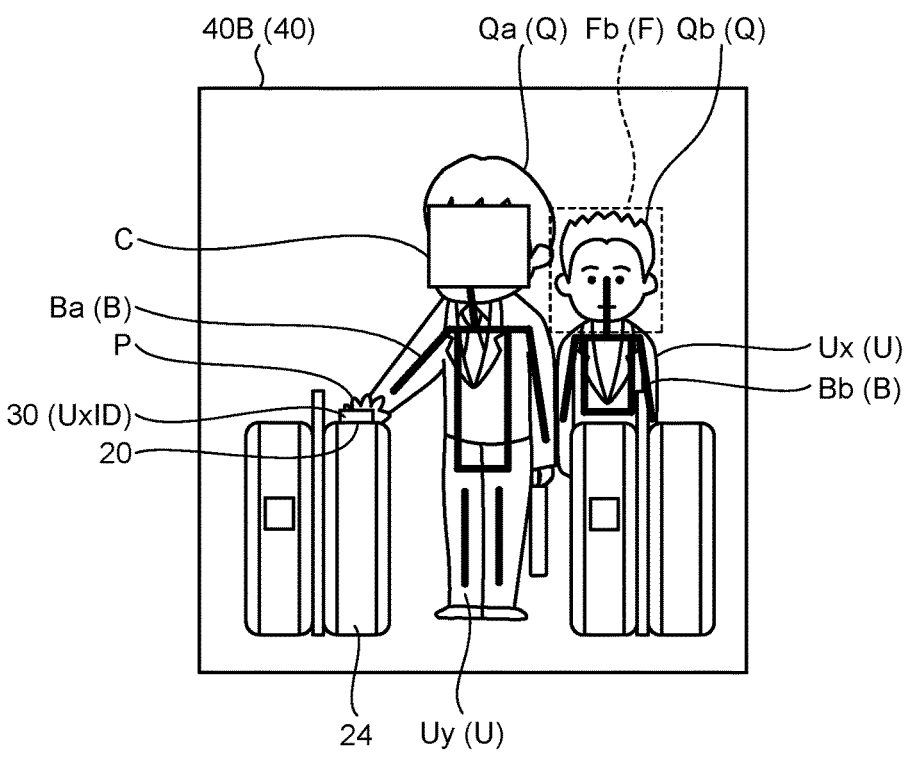
FIG. 6 is a schematic diagram of a photographed image.
Figure 7:
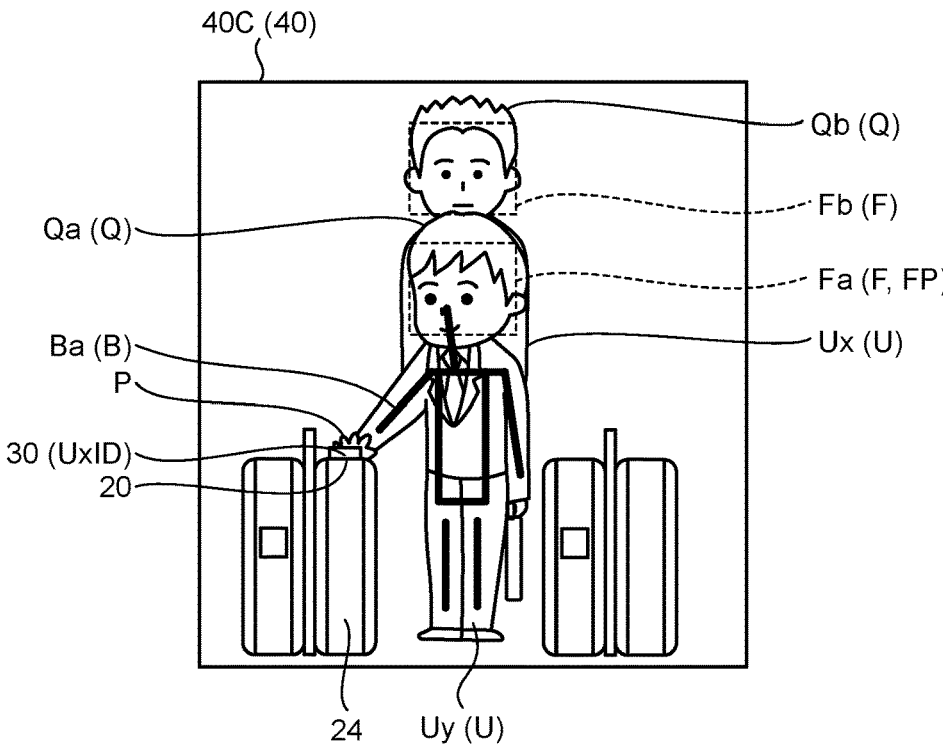
FIG. 7 is a schematic diagram of a photographed image.

FIG. 4, FIG. 6, and FIG. 7 are explanatory diagrams of an example of the photographed image 40 taken under the above assumptions.

First, a description will be given with reference to FIG. 4. The photographed image 40A illustrated in FIG.

4 is an explanatory diagram of an example of the photographed image 40 capturing the user Uy who is carrying the authentication medium 30 in which the identification information "UxID" of the user Ux is recorded, and the user Ux who is not carrying the authentication medium 30, when the two users U are standing side by side in an oblique transverse direction.

In this case, the identification information acquisition unit 18B acquires the identification information "UxID" of the user Ux from the reading unit 20 that reads the authentication media 30. Moreover, the photographed image acquisition unit 18C acquires the photographed image 40A as the photographed image 40 at the time when the identification information "UxID" is read. In the photographed image 40A, the face image region Fa of the user Uy, the skeleton information Ba of the user Uy, the face image region Fb of the user Ux, and the skeleton information Bb of the user Ux are each analyzed by the photographed image analysis unit 18A.

By performing the specification process described above using the photographed image 40A, the specification unit 18D specifies the face image region Fa of the user Uy who is carrying the authentication medium 30 at the time when the identification information "UxID" is read, as the passerby face image FP. Then, the authentication unit 18G determines whether the correct face image corresponding to the identification information "UxID" matches with the specified passerby face image FP. In this process, the identification information read from the authentication medium 30 is the identification information "UxID" of the user Ux. On the other hand, the user U who is carrying the authentication medium 30 is the user Uy, and the passerby face image FP specified by the specification unit 18D is the face image region Fa of the user Uy. Therefore, the correct face image corresponding to the identification "UxID" does not match with the specified passerby face image FP. Thus, in this case, the authentication unit 18G recognizes the user Uy who is carrying the authentication medium 30, as an unauthorized person.

Therefore, in a case where the authorized user Ux and the unauthorized user U are both captured in the photographed image 40 to be verified at the same time, and where the unauthorized user Uy is carrying the authentication medium 30 in which the identification information of the authorized user Ux is recorded, the passage management device 10 of the present embodiment can recognize the user Uy as the unauthorized person. In other words, the passage management device 10 can prevent the user Uy from impersonating the user Ux and illegally passing the passage area S.

FIG. 6 is a schematic diagram of an example of a photographed image 40B. The photographed image 40B is an example of the photographed image 40.

The photographed image 40B illustrated in FIG. 6 is an explanatory diagram of an example of the photographed image 40 capturing the two users U including the user Uy who is carrying the authentication medium 30 in which the identification information "UxID" of the user Ux is recorded and who is hiding his/her face with a cover member C, and the user Ux who is not carrying the authentication medium 30.

In this case, the identification information acquisition unit 18B acquires the identification information "UxID" of the user Ux from the reading unit 20 that reads the authentication media 30. Moreover, the photographed image acquisition unit 18C acquires the photographed image 40B as the photographed image 40 at the time when the identification information "UxID" is read. In the photographed image 40B, the skeleton information Ba of the user Uy, the face image region Fb of the user Ux, and the skeleton information Bb of the user Ux are each analyzed by the photographed image analysis unit 18A. Because the face of the user Uy is hidden by the cover member C, the face image region F of the user Uy is not included in the analysis results.

Although the specification unit 18D performs the specification process described above using the photographed image 40B, the specification unit 18D cannot specify the face image region F of the user Uy who is carrying the authentication medium 30 in which the identification information is recorded when the identification information "UxID" is read. This is because the face of the user Uy is hidden by the cover member C. Therefore, the authentication unit 18G recognizes the user Uy who is carrying the authentication medium 30 as an unauthorized person.

Therefore, in a case where the authorized user Ux and the unauthorized user U are both captured in the photographed image 40 to be verified at the same time, and where the unauthorized user Uy is hidden by the cover member C and the like, the passage management device 10 of the present embodiment can recognize the user Uy as an unauthorized person.

FIG. 7 is a schematic diagram of an example of a photographed image 40C. The photographed image 40C is an example of the photographed image 40.

The photographed image 40C illustrated in FIG. 7 is an explanatory diagram of an example of the photographed image 40 capturing the user Uy who is carrying the authentication medium 30 in which the identification information "UxID" of the user Ux is recorded, and the user Ux who is not carrying the authentication medium 30, when the two users U are standing side by side in the entering direction of the passage area X (see the arrow X direction in FIG. 1).

In this case, the identification information acquisition unit 18B acquires the identification information "UxID" of the user Ux from the reading unit 20 that reads the authentication media 30. Moreover, the photographed image acquisition unit 18C acquires the photographed image 40C as the photographed image 40 at the time when the identification information "UxID" is read. In the photographed image 40C, the face image region Fa of the user Uy, the skeleton information Ba of the user Uy, and the face image region Fb of the user Ux are each analyzed by the photographed image analysis unit 18A. The skeleton information Bb of the user Ux is analyzed while being hidden by the user Uy. Hence, the skeleton information Bb of the user Ux is not included in the analysis results.

By performing the specification process described above using the photographed image 40C, the specification unit 18D specifies the face image region Fa of the user Uy who is carrying the authentication medium 30 at the time when the identification information "UxID" is read, as the passerby face image FP. In other words, by using the analysis results, as the face image region F of the user U who is carrying the authentication medium 30, the specification unit 18D specifies the face image region Fa of the user Uy who is carrying the authentication medium 30 as the passerby face image FP, instead of the user Ux who is captured behind the user Uy in an overlapping manner.

Then, the authentication unit 18G determines whether the correct face image corresponding to the identification information "UxID" matches with the specified passerby face image FP. In this process, the identification information read from the authentication medium 30 is the identification information "UxID" of the user Ux. On the other hand, the user U who is carrying the authentication medium 30 is the user Uy, and the passerby face image FP specified by the specification unit 18D is the face image region Fa of the user Uy. Therefore, the correct face image corresponding to the identification "UxID" does not match with the specified passerby face image FP. Thus, in this case, the authentication unit 18G recognizes the user Uy who is carrying the authentication medium 30, as an unauthorized person.

If the number of face image regions F in the photographed image 40C does not match with the number of detected skeleton information B represented by the skeleton information B included in the analysis results of the photographed image 40C, the authentication unit 18G may recognize the user U captured in the photographed image 40C as an unauthorized person.

Therefore, in a case where the authorized user Ux and the unauthorized user U are both captured in the photographed image 40 to be verified at the same time, and where the unauthorized user Uy is carrying the authentication medium 30 in which the identification information of the authorized user Ux is recorded, the passage management device 10 of the present embodiment can recognize the user Uy as the unauthorized person.

Therefore, the passage management device 10 of the present embodiment can improve the security measures for the passage.

Next, an example of a hardware configuration of the passage management device 10 of the above embodiment will be described.

Figure 8:
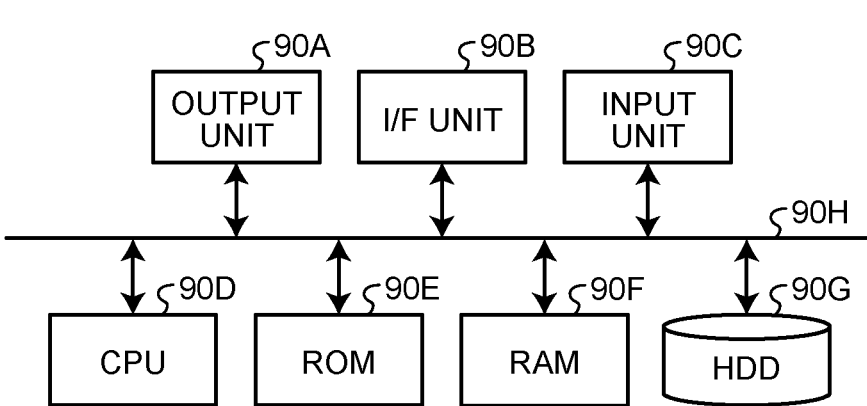
FIG. 8 is a hardware configuration diagram.

FIG. 8 is a hardware configuration diagram of an example of the passage management devices 10 of the above embodiment.

The passage management device 10 of the above embodiment includes a control device such as a Central Processing Unit (CPU) 90D; a storage device such as a Read Only Memory (ROM) 90E, a Random Access Memory (RAM) 90F, and a Hard Disk Drive (HDD) 90G; an I/F unit 90B that is an interface with various devices; an output unit 90A that outputs various types of information; an input unit 90C that receives user operations; and a bus 90H that connects the units. The hardware configuration uses a normal computer. In this case, the control unit 18 in FIG. 2 corresponds to a control device such as the CPU 90D.

In the passage management device 10 of the above embodiment, each of the units described above is implemented on a computer, when the CPU 90D reads a passage management program from the ROM 90E onto the RAM 90F to execute the read program.

The passage management program for executing each of the processes described above performed by the passage management device 10 of the above embodiment may also be stored in the HDD 90G. Moreover, the passage management program for executing each of the processes described above performed by the passage management device 10 of the above embodiment may also be provided by being incorporated in the ROM 90E in advance.

Furthermore, the passage management program for executing the process described above performed by the passage management device 10 of the above embodiment may also be provided as a computer program product stored in a computer readable storage medium such as a CD-ROM, a CD-R, a memory card, a digital versatile disc (DVD), a flexible disk (FD), and the like in an installable or executable format file. Still furthermore, the passage management program for executing the process described above performed by the passage management device 10 of the above embodiment may also be stored on a computer connected to a network such as the Internet and provided by being downloaded via the network. Still furthermore, the passage management program for executing the process described above performed by the passage management device 10 of the above embodiment may also be provided or distributed via a network such as the Internet.

In the above example, the passage management device 10 includes the passage management device 10, the UI unit 14, and the communication unit 16. However, it is not limited thereto, and the passage management device according to the embodiments herein may also include the control unit 18.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A passage management computer program product having a non-transitory computer readable medium including programmed instructions, wherein the instructions, when executed by a computer, cause the computer to execute:

acquiring identification information of a user read by a reading unit that is installed in a passage area and that reads the identification information from an authentication medium;

acquiring a photographed image of the passage area;

specifying, among one or more face regions in the photographed image, a face image region of a user who is carrying the authentication medium as a passerby face image; and when the passerby face image matches with a pre-stored face image corresponding to the identification information, authenticating the user who is carrying the authentication medium as an authorized person, and when the passerby face image does not match with the pre-stored face image, authenticating the user who is carrying the authentication medium as an unauthorized person, wherein the specifying includes specifying a carrying part of the authentication medium in a body of a user captured in the photographed image, from the photographed image, and among the one or more face image regions in the photographed image, specifying the face image region of the user having the specified carrying part as a part of the body, as the passerby face image.

2. The passage management computer program product according to claim 1, wherein among the one or more face image regions in the photographed image, the specifying specifies the face image region of the user who is carrying the authentication medium when the reading unit reads the identification information from the authentication medium, as the passerby face image.

3. The passage management computer program product according to claim 1, wherein the specifying of the passerby face image specifies the face image region of the user with the carrying part as the part of the body, as the passerby face image, using a positional relation between the carrying part based on skeleton information of the user in the photographed image, and a face image position of each of the one or more face image regions based on the skeleton information in the photographed image.

4. The passage management computer program product according to claim 1, wherein the carrying part is a hand of the user.

5. The passage management computer program product according to claim 1, wherein the acquiring of the photographed image captures at least a single image of the passage area when the reading unit reads the identification information.

6. The passage management computer program product according to claim 1, wherein the acquiring of the photographed image acquires a plurality of photographed images of the passage area taken in time series, and the specifying of the carrying part specifies the carrying part by estimating the carrying part of the authentication medium when the reading unit reads the identification information, based on the photographed images.

7. The passage management computer program product according to claim 1, wherein the instructions cause the computer to further execute outputting an authentication result by the authenticating.

8. The passage management computer program product according to claim 1, wherein the instructions cause the computer to further execute controlling an entrance opening/closing drive unit provided in the passage area, to allow or restrict the user to pass through the passage area, according to an authentication result by the authenticating.

9. A passage management method executed by a control unit, the passage management method comprising:

acquiring identification information of a user read by a reading unit that is installed in a passage area and that reads the identification information from an authentication medium;

acquiring a photographed image of the passage area;

specifying, among one or more face image regions in the photographed image, a face image region of a user who is carrying the authentication medium as a passerby face image; and when the passerby face image matches with a pre-stored face image corresponding to the identification information, authenticating the user who is carrying the authentication medium as an authorized person, and when the passerby face image does not match with the pre-stored face image, authenticating the user who is carrying the authentication medium as an unauthorized person, wherein the specifying includes specifying a carrying part of the authentication medium in a body of a user captured in the photographed image, from the photographed image, and among the one or more face image regions in the photographed image, specifying the face image region of the user having the specified carrying part as a part of the body, as the passerby face image.

10. A passage management device comprising:

an identification information acquisition unit that acquires identification information of a user read by a reading unit that is installed in a passage area and that reads the identification information from an authentication medium;

a photographed image acquisition unit that acquires a photographed image of the passage area;

a specification unit that, among one or more face image regions in the photographed image, specifies a face image region of a user who is carrying the authentication medium as a passerby face image; and an authentication unit that, when the passerby face image matches with a pre-stored face image corresponding to the identification information, authenticates the user who is carrying the authentication medium as an authorized person, and when the passerby face image does not match with the pre-stored face image, authenticates the user who is carrying the authentication medium as an unauthorized person, wherein the specification unit specifies the face image region of the user by specifying a carrying part of the authentication medium in a body of a user captured in the photographed image, from the photographed image, and among the one or more face image regions in the photographed image, specifying the face image region of the user having the specified carrying part as a part of the body, as the passerby face image.

* * * * *